United States Patent [19]
Nakamichi

[11] Patent Number: 6,097,693
[45] Date of Patent: Aug. 1, 2000

[54] CLAMPING MECHANISM FOR A DISK PLAYBACK DEVICE INCLUDING A PIVOTABLE CLAMP ARM

[75] Inventor: Niro Nakamichi, Tokyo, Japan

[73] Assignee: Nakamichi Corporation, Japan

[21] Appl. No.: 09/055,576

[22] Filed: Apr. 6, 1998

[30] Foreign Application Priority Data

Apr. 17, 1997 [JP] Japan ................................. 9-115171

[51] Int. Cl.[7] ................................................ G11B 17/022
[52] U.S. Cl. .......................................... 369/270; 369/192
[58] Field of Search ................................. 369/191, 192, 369/178, 270, 271, 36; 360/98.04

[56] References Cited

U.S. PATENT DOCUMENTS

| 5,099,466 | 3/1992 | Kimura ........................................ 369/36 |
| 5,123,001 | 6/1992 | Nakamichi et al. ........................ 369/36 |
| 5,138,591 | 8/1992 | Ogawa et al. .............................. 369/36 |
| 5,226,028 | 7/1993 | Yamada et al. ........................... 369/77.1 |
| 5,481,512 | 1/1996 | Morioka et al. ........................... 369/36 |
| 5,636,198 | 6/1997 | Maeng ....................................... 369/191 |
| 5,636,199 | 6/1997 | Ariyoshi et al. .......................... 369/191 |
| 5,764,612 | 6/1998 | Tanaka et al. ........................... 369/75.2 |
| 5,831,948 | 11/1998 | Suzuki ....................................... 369/36 |
| 5,867,473 | 2/1999 | Inoue ........................................ 369/271 |
| 5,970,044 | 10/1999 | Kambayashi et al. .................. 369/271 |

FOREIGN PATENT DOCUMENTS 544918  11/1993  Japan .

*Primary Examiner*—Brian E. Miller
*Attorney, Agent, or Firm*—Morrison Law Firm

[57] ABSTRACT

A clamper mechanism in a changer-type disk playback device has a clamper and a clamper arm with a locking mechanism which engages the clamper. A magnet on the clamper attracts a corresponding magnet on a turntable of the disk playback device. This attraction disengages the locking mechanism thereby releasing the clamper and allowing the clamper to clamp a disk when the clamper arm is moved from a position in axial alignment with the turntable. The clamping mechanism moves in a plane substantially parallel to a recorded surface of stored disks in the playback device so that the space required to operate the clamping mechanism is minimized.

25 Claims, 16 Drawing Sheets

CLAMPING MECHANISM FOR A DISK PLAYBACK DEVICE INCLUDING A PIVOTABLE CLAMP ARM

BACKGROUND OF THE INVENTION

The present invention relates to a clamping mechanism used in changer-type disk playback devices wherein the surfaces of disks stored in the device overlap with the center of rotation of the disk being played back.

Japanese Examined Patent Publication Number 7-86999 discloses a changer-type disk playback device wherein the surfaces of the disks stocked in the device overlap with the center of rotation of the disk being played back. This is done to allow the device to be made more compact and to allow multiple disks to be stored. In the device according to this disclosure, playback means, including an optical pickup, a turntable, and the like, and a clamper arm supporting a clamper, are positioned between a playback disk and stored disks positioned above and below the playback disk. By pivoting the clamper arm upward, the playback disk is lifted up from a tray and mounted on the turntable.

Since the clamper operation is achieved by pivoting the clamper arm upward, the insertion of the clamper arm requires that the interval between the playback disk and the stored disks be increased. As a result, the height of the device is necessarily increased. This decreases the number of disks that can be stored within a particular set of dimensions, such as with car-mounted disk playback devices.

OBJECTS AND SUMMARY OF THE INVENTION

It is an object of the present invention to provide a disk player which overcomes the drawbacks of the prior art.

It is another object of the present invention to provide a clamping device for a disk player which efficiently utilizes the spatial dimensions of the disk player.

It is a still further object of the present invention to provide a clamping device for a disk player which can move a clamper into a clamping position and into another position away from a stored stack of disks so that the disks can move within the disk player.

Briefly stated, a clamper mechanism in a changer-type disk playback device has a clamper and a clamper arm with a locking mechanism which engages the clamper. A magnet on the clamper attracts a corresponding magnet on a turntable of the disk playback device. This attraction disengages the locking mechanism thereby allowing the clamper to clamp a disk when the clamper arm is moved from a position in axial alignment with the turntable. The clamping mechanism moves in a plane substantially parallel to a recorded surface of stored disks in the playback device so that the space required to operate the clamping mechanism is minimized.

According to an embodiment of the present invention, a clamping mechanism for a disk playback device has a chassis and a clamper. A clamper arm has a locking mechanism for engaging the clamper. The locking mechanism is moveable between a locked and an unlocked state. The clamper arm is rotateably mounted on the chassis and moveable between at least a first position and a second position. An optical mechanism is moveably mounted in the chassis. The first position in axial alignment with the optical mechanism. A forcing means selectively applies a force on the clamper effective to move the locking mechanism to the unlocked state and free the clamper from the clamper arm.

According to another embodiment of the present invention, a clamping mechanism for a disk playback device for playing a selected disk of a plurality of disks having a recorded surface includes a chassis and a clamper. A clamper arm has a locking mechanism for engaging the clamper. The locking mechanism is moveable between a locked and an unlocked state. The clamper arm is rotateably mounted on the chassis and moveable between a first position and a second position. An optical mechanism is moveably mounted in the chassis. The first position is in axial alignment with the optical mechanism. The second position is in substantial planar alignment with the recorded surface of the selected disk.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Figure 1:
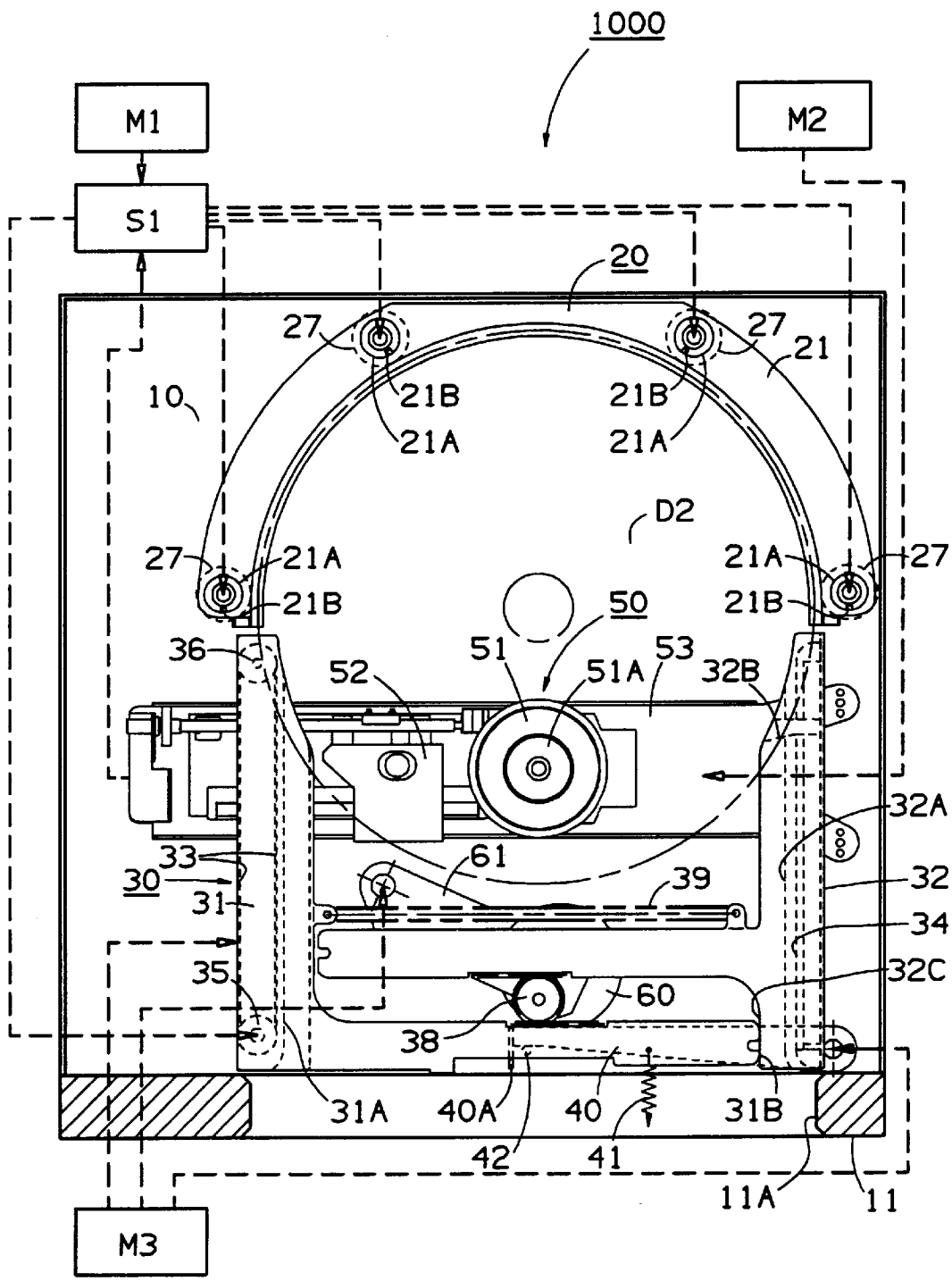
FIG. 1 is a schematic top-view drawing of a changer-type disk playback device 1000 in which the disk transfer mechanism of the present invention is implemented.

Referring to FIGS. 1–8, there is shown a schematic top-view drawing of a changer-type disk playback device 1000 which implements the clamping mechanism of the present invention. Disk playback device 1000 is a changer-type disk playback device capable of selectively playing back a plurality of disks. Disk playback device 1000 has a stocker 20, which holds a plurality of disks toward the rear of the device. A disk inserted from a slot 11A of a front panel 11 passes through a playback position and is stored in stocker 20.

A stocker 20 has six independent disk holders 21–26 (FIGS. 10–12) for holding six disks D1–D6 respectively. Spaces are formed between a disk at the playback position and disks above and below it at storage positions. An optical mechanism 50 and a clamper 60 are inserted into those spaces. Disk holders 21–26 are attached to four stocker screws 27 to allow vertical movement relative to chassis 10. The four stocker screws 27 are rotatably attached to chassis 10 and are connected to a drive mechanism M1 via a switching mechanism S1, which rotates the screws simultaneously. Switching mechanism S1 performs switching based on the position of optical mechanism 50, which is described later. When optical mechanism 50 is at a front position (FIG. 8), the drive force from drive mechanism M1 is transferred to stocker screw 27. When optical mechanism 50 is at a rear position (FIG. 1), the drive force from drive mechanism M1 is transferred to a pulley 35 of a driven disk guide 31, which is described later.

Figure 9:
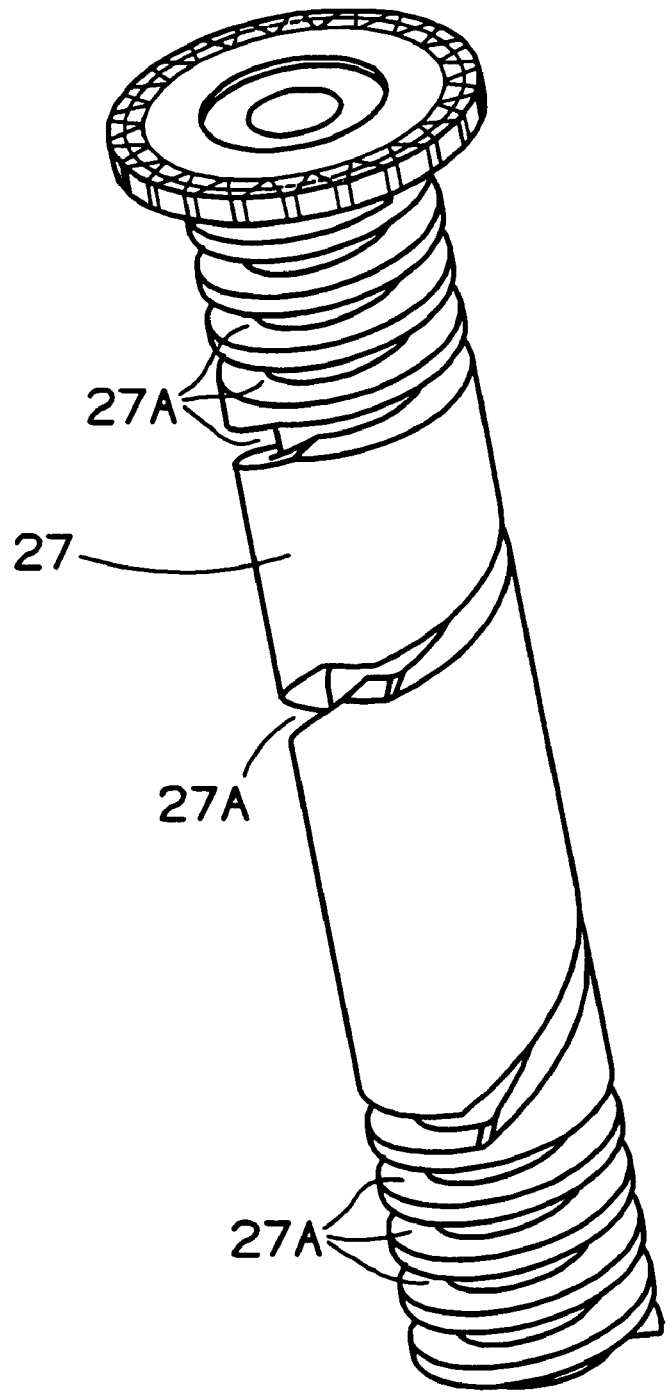
FIG. 9 is a perspective drawing of stocker screw 27.

Referring also to FIG. 9, a spiral guide 27A having an irregular pitch is formed on the circumferential edge of stocker screws 27. Disk holders 21–26 are guided up and down in the device via stocker screws 27. Guide holes 21A–26A are disposed in disk holders 21–26 in axial alignment with one another. Guide pins 21B–26B project into guide holes 21A–26A (in the drawing, guide holes 22A–26A are hidden). Guide pins 21B–26B are guided by spiral guide 27A. Thus, disk holders 21–26 are moved vertically according to the rotation of stocker screws 27 through engagement of guide pins 21B–26B with spiral guide 27A.

Figure 10:
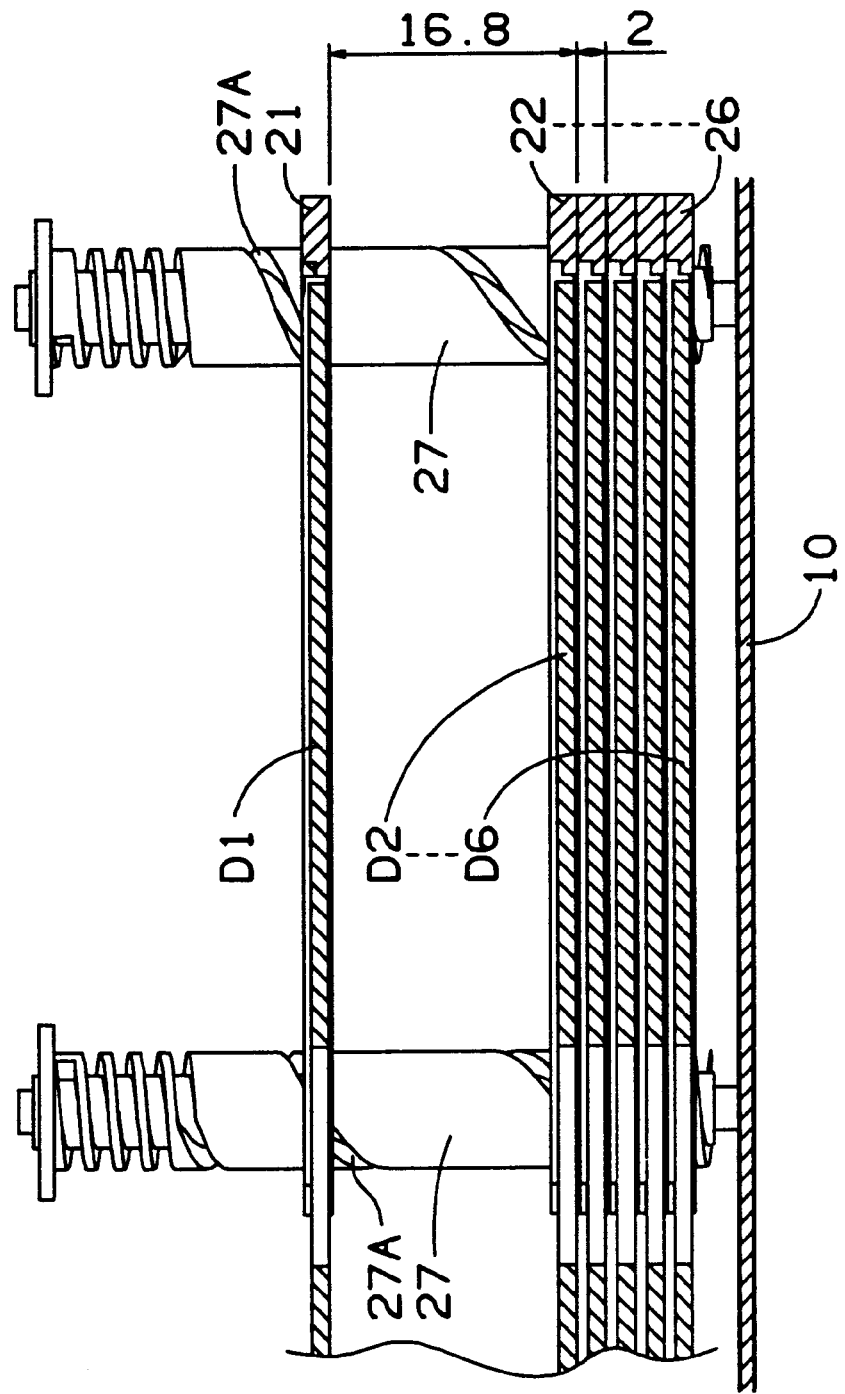
FIG. 10 is a cross-section drawing showing the positioning of spiral guide 27a and disk holders 21–26.
Figure 11:
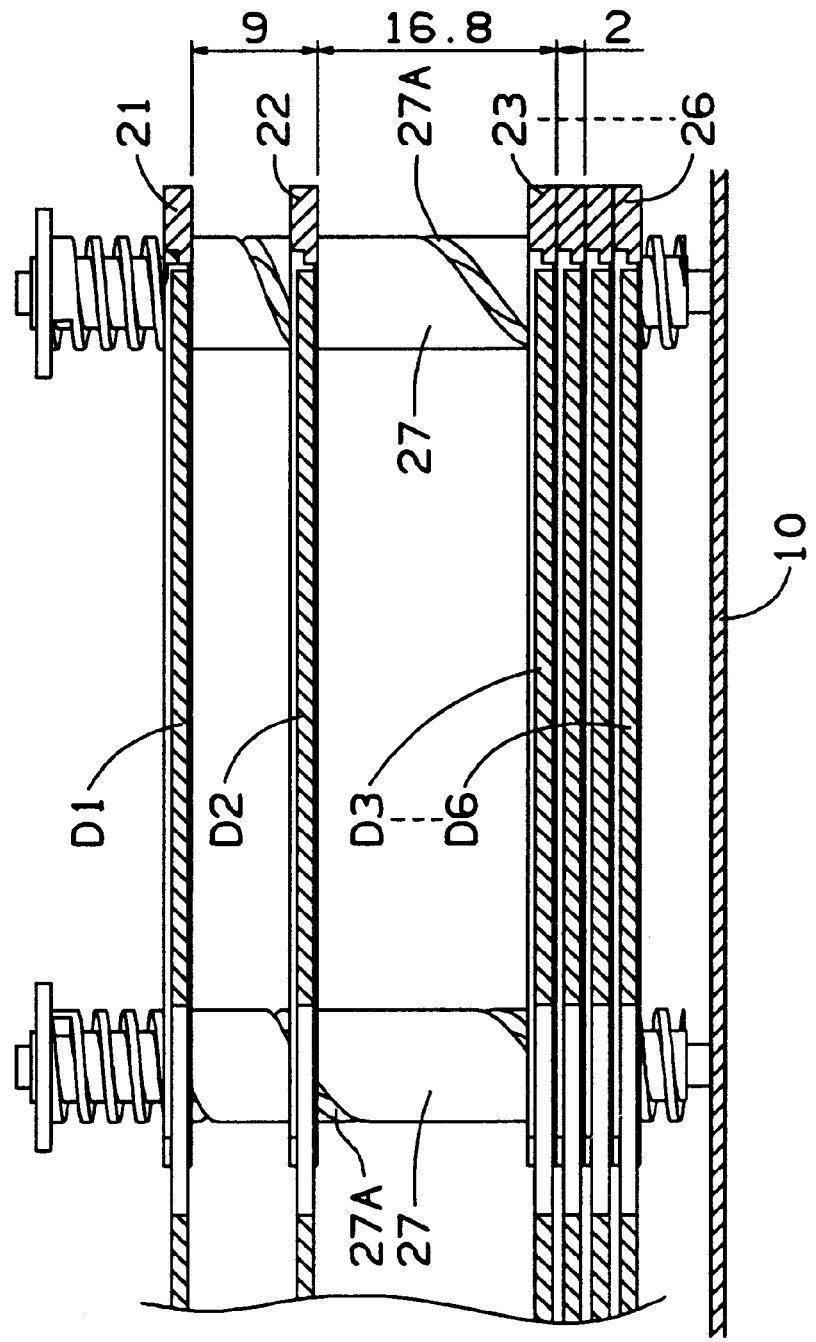
FIG. 11 is a cross-section drawing showing the positioning of spiral guide 27a and disk holders 21–26.
Figure 12:
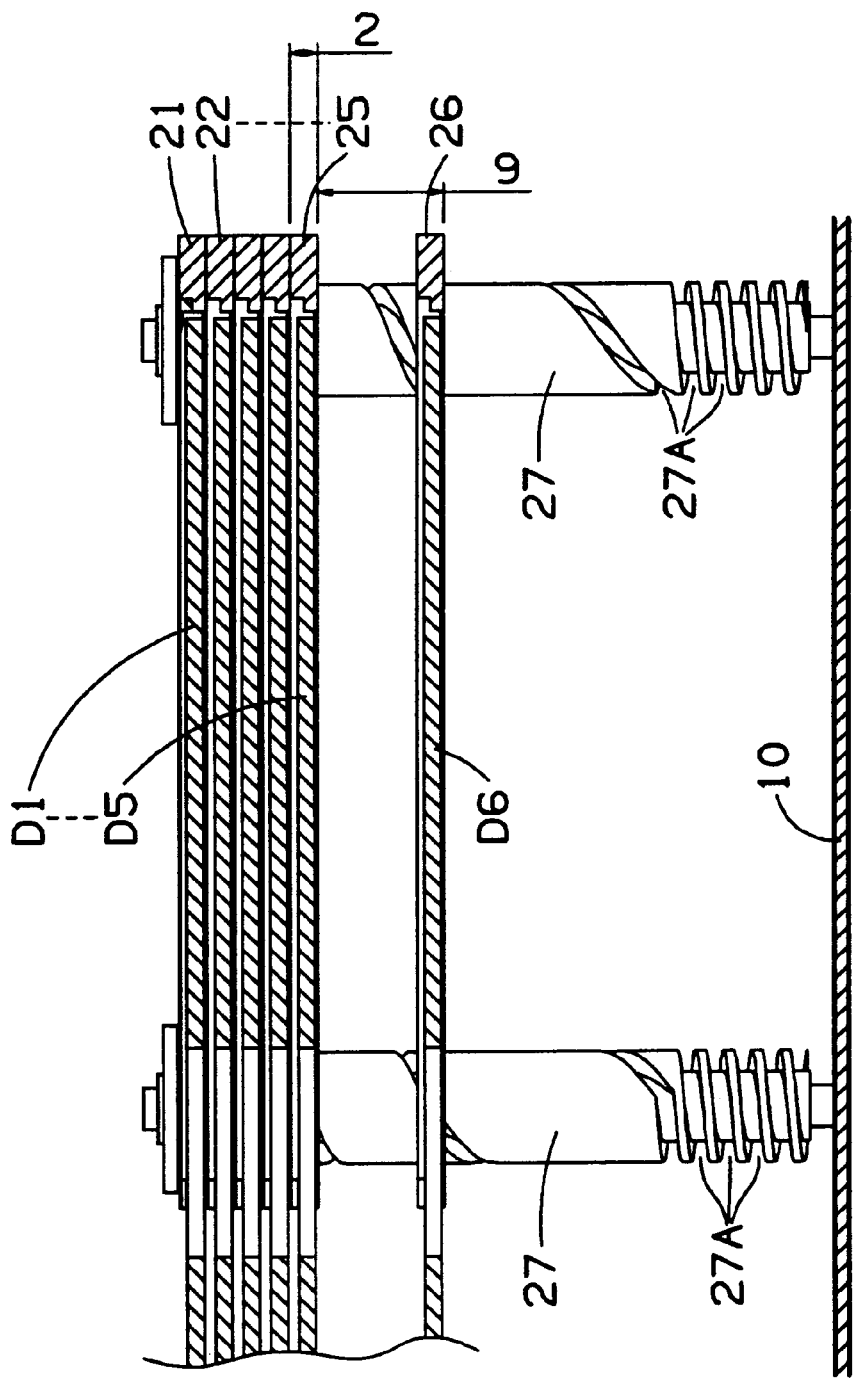
FIG. 12 is a cross-section drawing showing the positioning of spiral guide 27a and disk holders 21–26.

Referring to FIG. 10–FIG. 12, there are shown the relative positioning of stocker screws 27 and disk holders 21–26. When first disk holder 21 is brought to a disk transfer height (FIG. 10), second disk holder 22 is positioned 16.8 mm below first disk holder 21. Third disk holder 23 through sixth disk holder 26 are positioned at equal intervals, and each disk is positioned 2 mm below the disk above it (disk holders 22–25). From this state, if stocker screw 27 makes one clockwise (as seen from above the device) rotation, first disk holder 21 moves up 9 mm and second disk holder 22 moves up 16.8 mm so that it is aligned with the disk transfer height. At the same time, disk holder 23 through sixth disk holder 26 all move up 2 mm (FIG. 11). Thereafter, each time stocker screw 27 makes a full rotation, the next lowest disk holder is aligned with the disk transfer height. When sixth disk holder 26 is positioned at the disk transfer height, fifth disk holder 25 is positioned 9 mm above sixth disk holder 26, and first disk holder 21 through fourth disk holder 24 are positioned at equal intervals, each disk being positioned 2 mm above the disk below it (disk holders 22–25) (FIG. 12).

Figure 2:
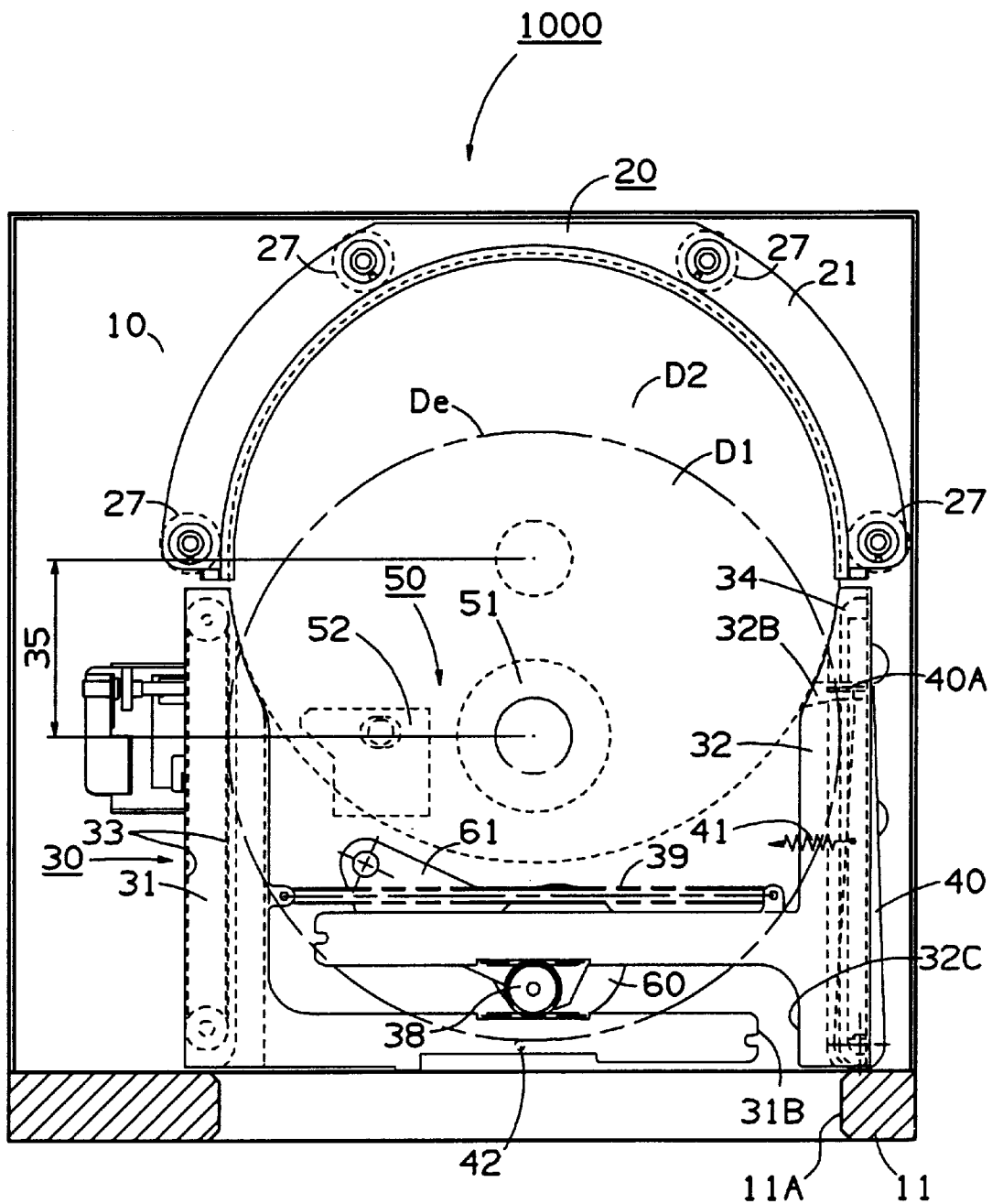
FIG. 2 is a top-view drawing for the purpose of describing the operations of disk playback device 1000.
Figure 6:
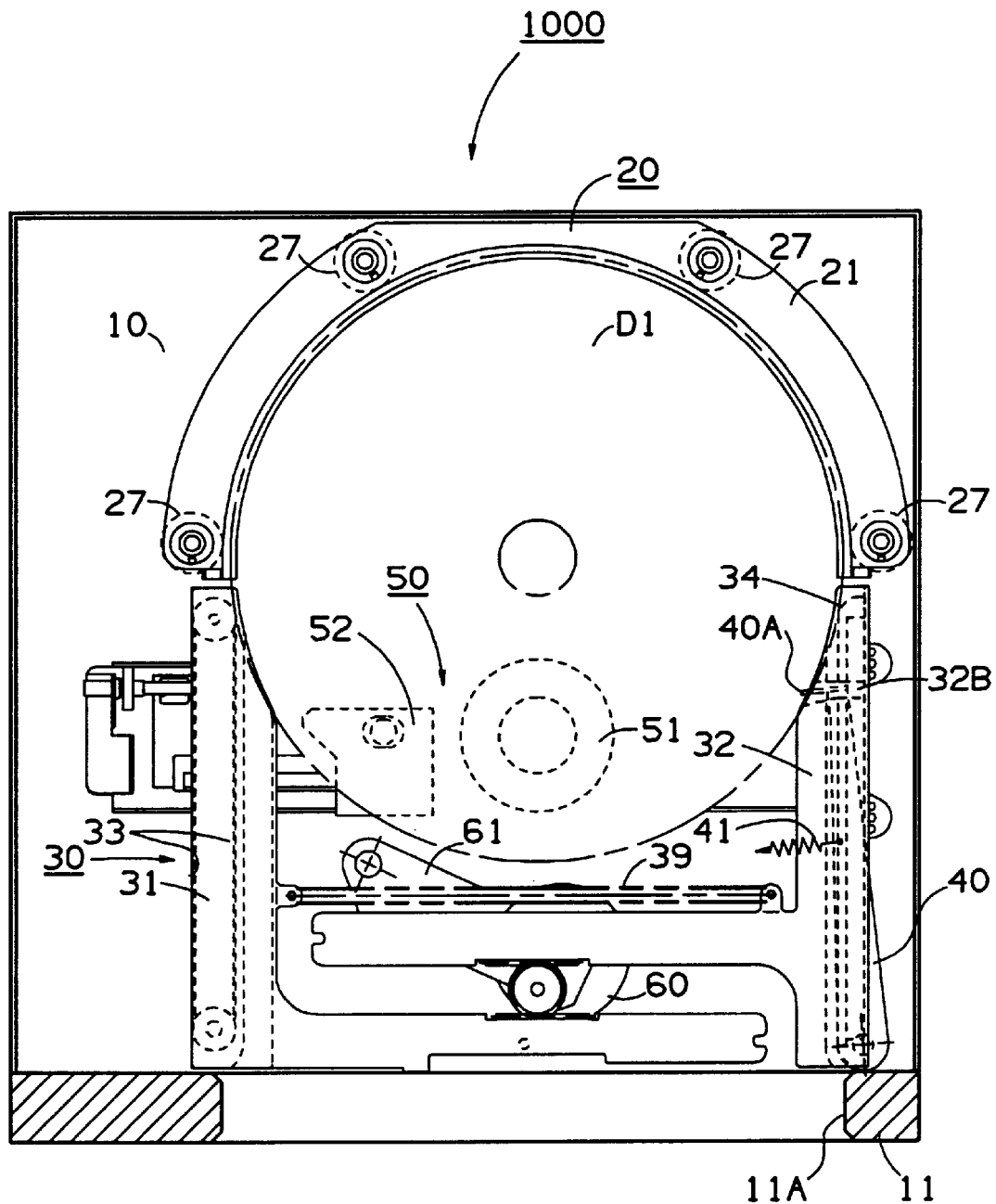
FIG. 6 is a top-view drawing for the purpose of describing the operations of disk playback device 1000.

Referring to FIGS. 1, 2, and 6, a disk inserted through slot 11a is supported from the left and right sides by a disk transfer mechanism 30. The disk passes through a playback position (FIG. 2) and is transferred to a holding position (FIG. 6), where it is held in disk holder 21, which is aligned with the disk transfer height. The height of slot 11A is set so that the slot is larger toward the center and more narrow toward the left and right ends. This allows slot 11A to engage only with the edge of the disk. According to the device of this embodiment, the playback position is positioned toward the front of the device 35 mm from the storing position. The center of rotation of a disk D1 at the playback position overlaps with the disk surface of a disk D2 at the storing position (see FIG. 2).

Figure 13:
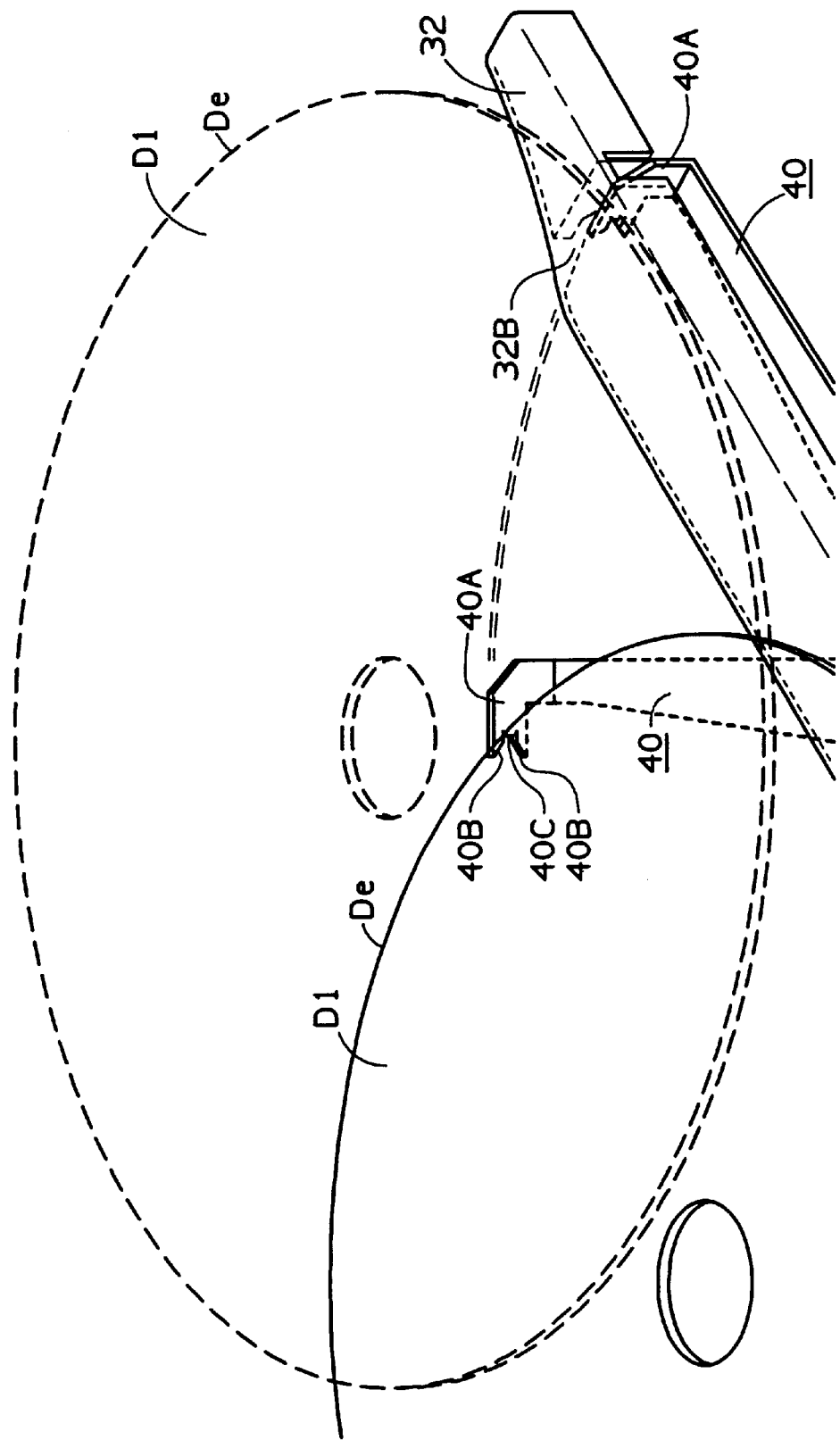
FIG. 13 is a schematic perspective drawing for the purpose of describing the operations of pivoting arm 40.

Disk transfer mechanism 30 has a driven disk guide 31 disposed toward the left of the device and a fixed disk guide 32 disposed to the right of the device. Driven disk guide 31 has a guide groove 31A for guiding the left edge of a disk. Inside guide groove 31A, there is disposed a belt 33 for driving the outer left edge of the disk. Belt 33 is disposed across pulleys 35, 36 which are positioned at the front and the rear of driven disk guide 31. Pulley 35 is connected via switching mechanism S1 to drive mechanism M1, which rotates pulley 35. Fixed disk guide 32 has a guide groove 32A for guiding the right edge of a disk. Inside guide groove 32A, there is disposed a friction sheet 34, which engages with the outer right edge of the disk and prevents the disk from slipping. Referring momentarily to FIG. 13, a slit 32B is formed on fixed disk guide 32 to prevent engagement with a pivoting arm 40, which will be described later. Slit 32B is opened downward and is formed along the transfer path of an engagement cavity 40A of pivoting arm 40. Friction sheet 34 is discontinuous at slit 32B.

A guide groove formed on the chassis (not shown in the drawings) serves to guide driven and fixed disk guides 31, 32, allowing them to move to the left and right of the device. A rotatably supported pinion gear 38 connects driven and fixed disk guides 31, 32 so that they move in tandem. Driven and fixed disk guides 31, 32 are supported by a spring 39 and are positioned to an initial position, where they are engaged with side surfaces 31B, 32C. At the initial position, belt 33 and friction sheet 34 are separated by a distance that is smaller than the diameter of an inserted disk.

With disk transfer mechanism 30 described above, a disk is transferred while the outer left edge and the outer right edge of the disk are supported by driven and fixed disk guides 31, 32. Thus, during the transfer operation, pitching vibration can occur (with the points supporting the disk acting as the pivot). Also, guide grooves 31A, 32A must be formed shallow so that the recorded area of the disk is not damaged. Thus, the correction force allotted to keep the disk level is weak. Also, if the disk is inserted with the front of the disk sloping up or down, the inserted end of the disk can come into contact with mechanisms inside the device, such as the clamper, resulting in damage.

Referring to FIG. 13, in order to overcome this problem, disk transfer mechanism 30 includes a support member to provide support to the disk in order to keep the disk level during the transfer operation. According to this embodiment, the support member is a pivoting arm 40. Engagement cavity 40A is disposed at the end of pivoting arm 40 to engage with a disk edge De. Pivoting arm 40 is rotatably attached to the front and to the right of the device so that it passes through slit 32B of fixed disk guide 32. Thus, pivoting arm 40 is be set to the minimum required length without obstructing disk transfer. Engagement cavity 40A has a sloped surface 40B, which guides the disk inserted from slot 11A, and a C-shaped groove 40C, into which disk edge De is inserted. As with guide grooves 31A, 32A of driven and fixed disk guides 31, 32, C-shaped groove 40C is formed with a depth that prevents it from engaging with the disk recording area.

Figure 3:
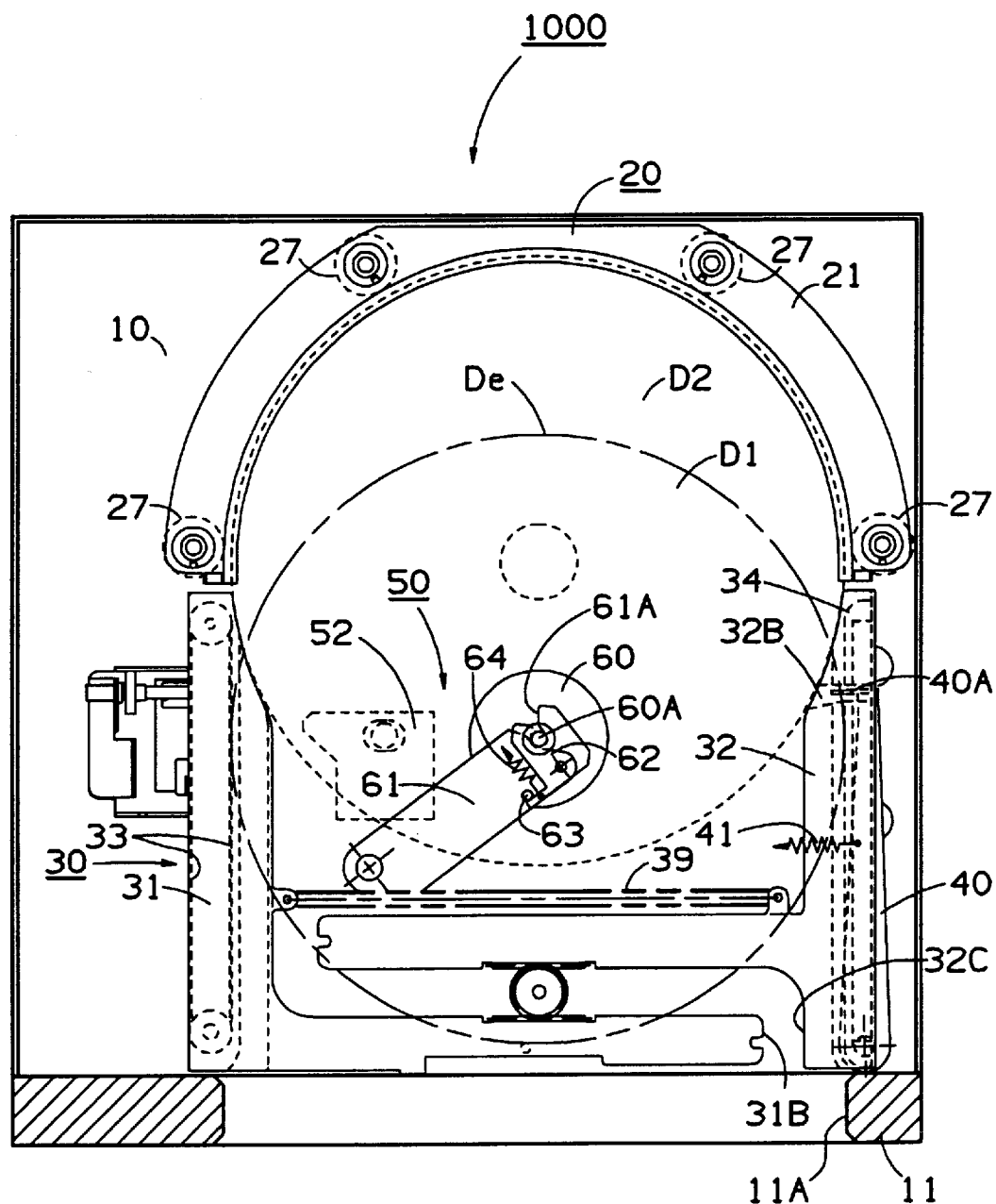
FIG. 3 is a top-view drawing for the purpose of describing the operations of disk playback device 1000.
Figure 4:
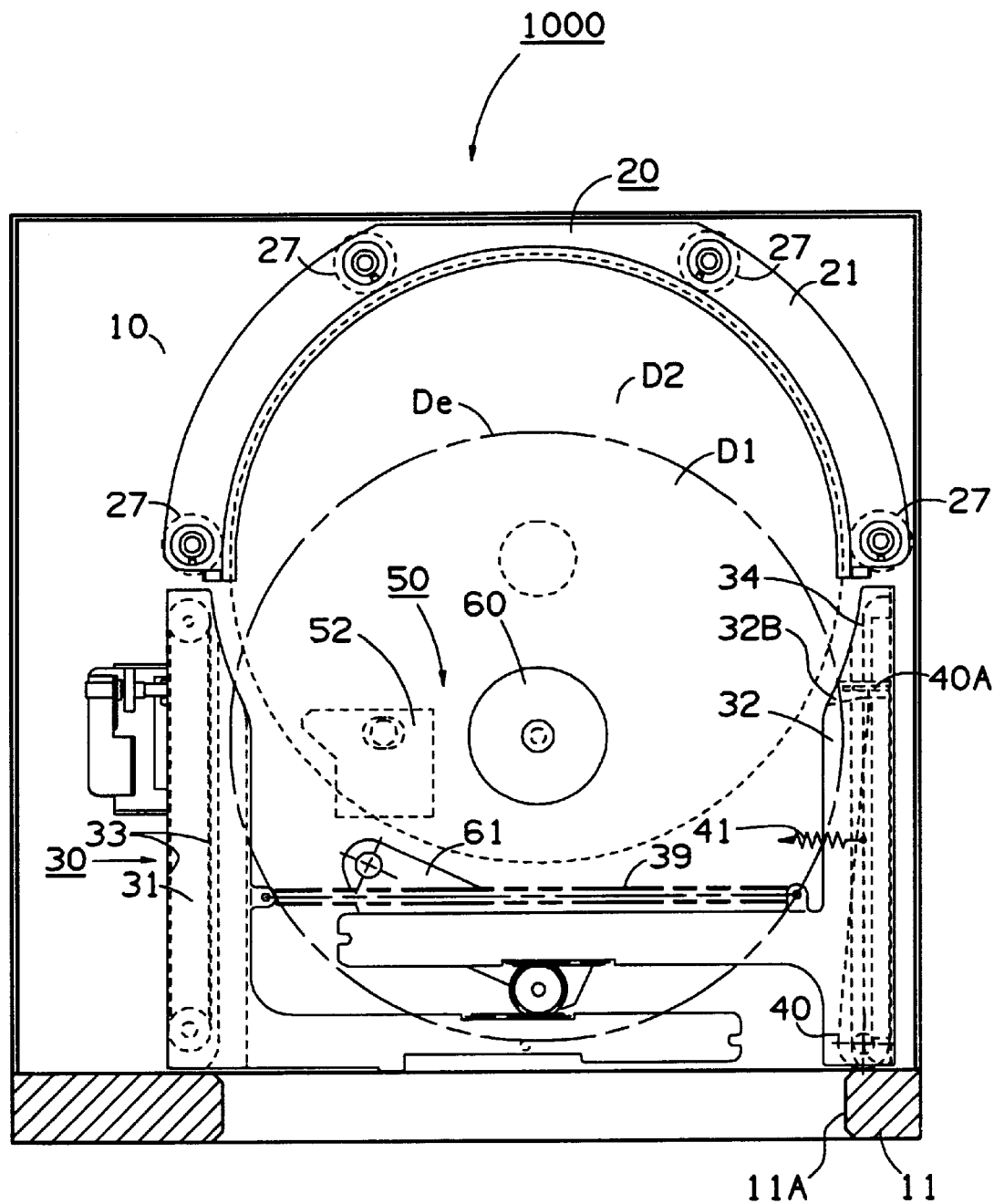
FIG. 4 is a top-view drawing for the purpose of describing the operations of disk playback device 1000.
Figure 7:
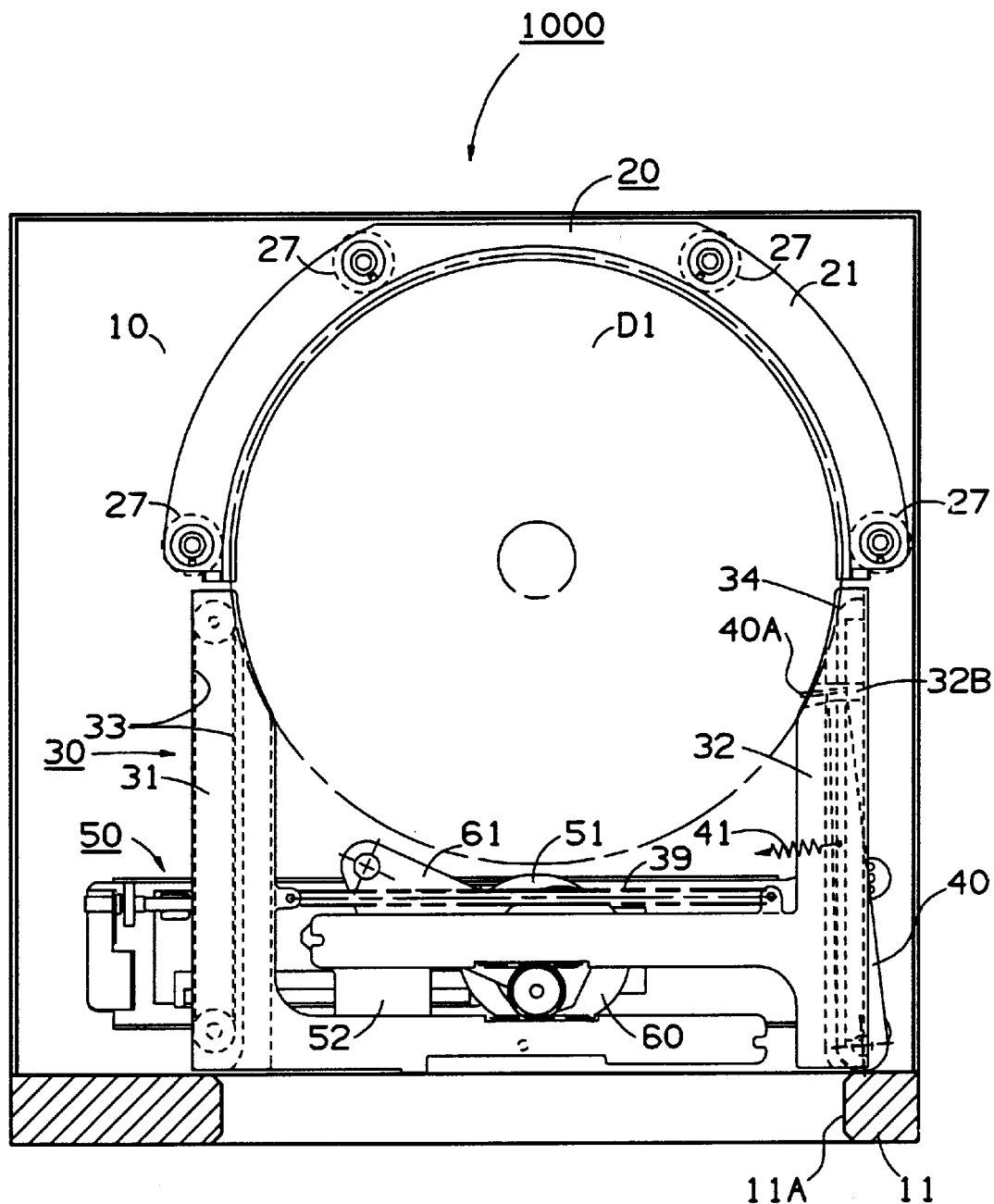
FIG. 7 is a top-view drawing for the purpose of describing the operations of disk playback device 1000.
Figure 8:
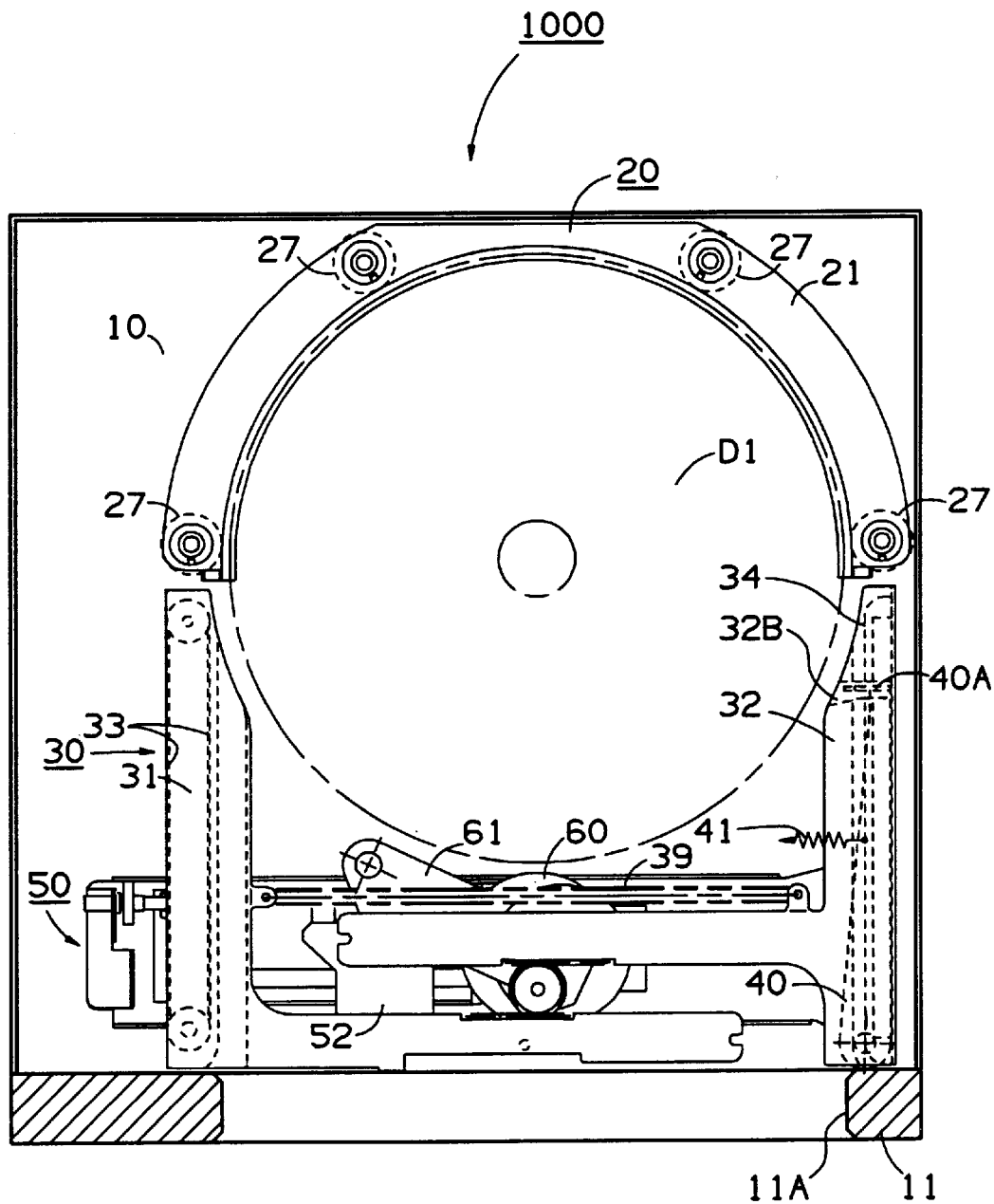
FIG. 8 is a top-view drawing for the purpose of describing the operations of disk playback device 1000.

Referring to FIGS. 1–8, pivoting arm 40 is pulled counter-clockwise by a spring 41 and is positioned so that it engages with a stopper 42. At this state, engagement cavity 40a is brought near the back of slot 11A. Pivoting arm 40 pivots in tandem with the transfer of the inserted disk, keeping the disk level. Pivoting arm 40 is then driven by drive mechanism M3 and is, along with disk transfer mechanism 30 described above, brought to a position away from the edge of the disk (FIG. 4, FIG. 8).

Optical mechanism 50 optically reads the information recorded on a disk which has been brought to the playback position. Optical mechanism 50 includes a turntable 51, on which the disk is mounted. An optical head 52 is attached so that it moves along the radius of the disk, which optically reads recorded information. An optical mechanism chassis 53 supporting turntable 51, and optical head 52 are all also included in optical mechanism 50. Optical mechanism 50 is driven by a drive mechanism M2 so that it moves forward and back between a rear position (FIG. 4) and a front position (FIG. 8). At the rear position, turntable 51 of optical mechanism 50 is co-axial with disk D1, which is at the playback position. At the front position, optical mechanism 50 is recessed away from the stored disks. At the rear position, optical mechanism 50 can move up and down between an up position and a down position. At the up position, the upper surface of turntable 51 is aligned with the bottom surface of disk D1, which is at the playback position. At the down position, optical mechanism 50 is recessed away from disk D1.

Referring again to FIG. 1, disk D1, when it is at the playback position, is fixed onto turntable 51 via a magnet clamper 60. A magnetic plate (not shown in the drawing) is attached to the bottom surface of clamper 60. The attractive force from a magnet 51A, which is attached to the center of turntable 51, fixes disk D1 to turntable 51. Clamper 60 is removably supported by clamper arm 61, which is pivotably supported on chassis 10. Clamper 60 is driven by drive mechanism M3 so that it pivots between a clamped position (FIG. 3) and an unclamped position (FIG. 1). At the clamped position, clamper 60 is co-axial with turntable 51, which has been brought to the rear position. At the unclamped position (FIG. 1), clamper 60 is moved toward the front of the device to a position where it does not overlap with the stocked disks in the device and so disk selection is possible.

Referring to FIG. 14–FIG. 17, a Y-shaped groove 61A is formed at the end of clamper arm 61. A shaft 60A having a T-shaped cross-section projects up from clamper 60 and is removably supported by Y-shaped groove 61A, thus keeping shaft 60A level. A lock plate 62 provides self-locking of shaft 60A when it is inserted into Y-shaped groove 61A. Lock plate 62 is supported by clamper arm 61 so that it can pivot around a shaft 61B. Spring 64 pulls lock plate 62 clockwise with a relatively weak force. Engagement with a stopper pin 63 limits clockwise pivoting of lock plate 62.

Figure 14:
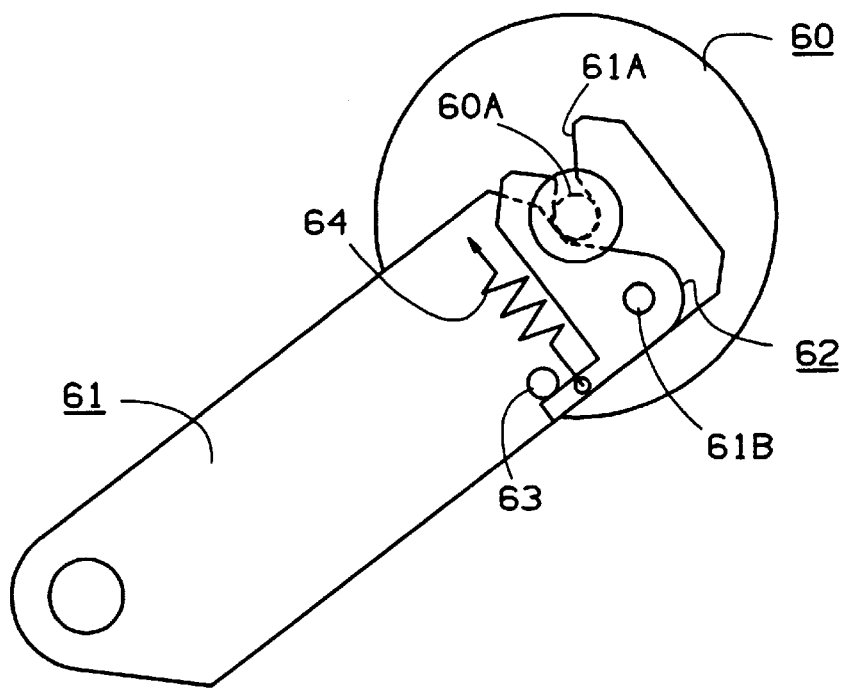
FIG. 14 is an enlarged schematic drawing showing how lock plate 62 and shaft 60a engage.
Figure 15:
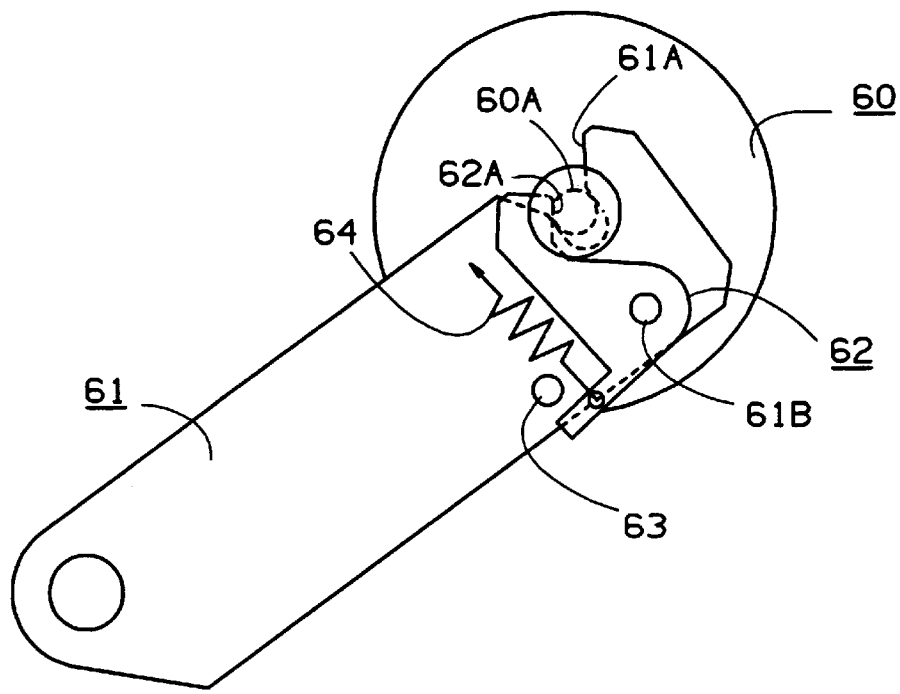
FIG. 15 is an enlarged schematic drawing showing how lock plate 62 and shaft 60a engage.
Figure 16:
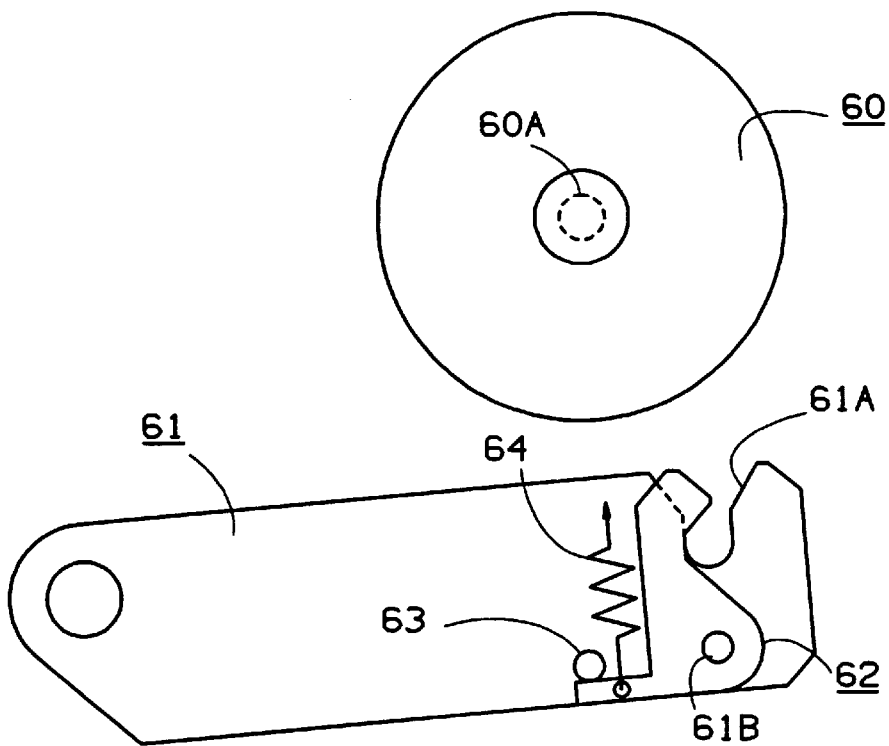
FIG. 16 is an enlarged schematic drawing showing how lock plate 62 and shaft 60a engage.
Figure 17:
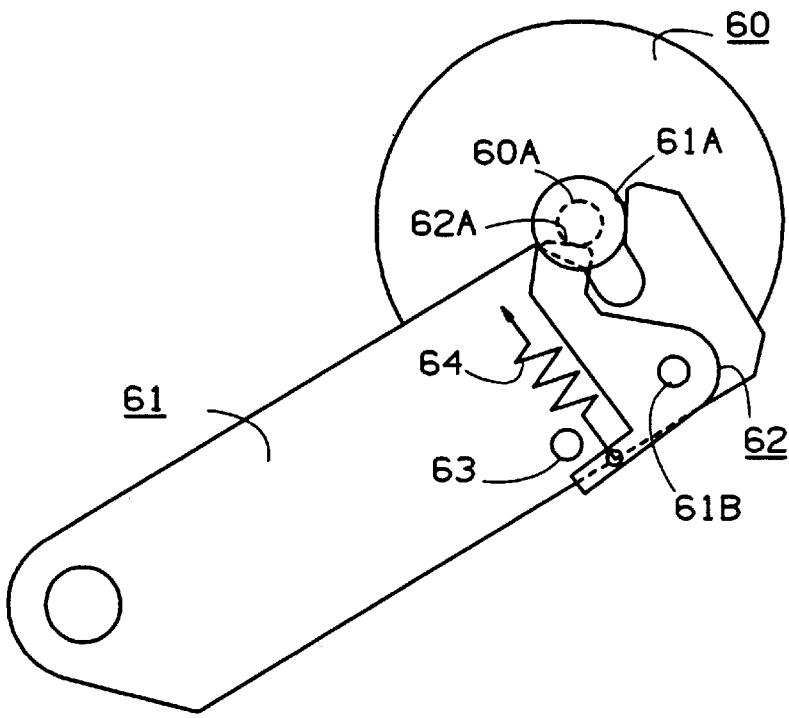
FIG. 17 is an enlarged schematic drawing showing how lock plate 62 and shaft 60a engage.

When a disk at the playback position is to be clamped, clamper 60 is kept locked within clamper arm 61 and clamper arm 61 is brought to the clamped position (FIG. 3, FIG. 14). Then, optical mechanism 50 is brought to the up position. The magnet of clamper 60 is strongly attracted to magnet 51A of optical mechanism 50. Clamper arm 61 is then pivoted clockwise from the clamped position. This causes lock plate 62 to be pushed counter-clockwise against the biasing force of spring 64 due to the engagement between sloped engagement surface 62A and shaft 60a (FIG. 15) and the magnetic attraction between the magnet of clamper 60 and magnet 51A. This results in the locked state being forcibly disabled (FIG. 16). Then, clamper arm 61, which has been unlocked from clamper 60, is pivoted to a position (in this embodiment, the same as the unclamped position) away from clamper 60, which is now in the clamped state (FIG. 4, 16).

Conversely, when clamping is to be disabled, clamper arm 61 is pivoted counter-clockwise and brought to the clamped position. Right before clamper arm 61 is brought to the clamped position, lock plate 62 momentarily pivots counter-clockwise due to the engagement between sloped engagement surface 62B and shaft 60A (FIG. 17), and then pivots clockwise so that shaft 60a is locked into Y-shaped groove 61A (FIG. 14). Then, optical mechanism 50 is brought to the down position and the attraction between the magnet of clamper 60 and magnet 51A is disabled, thus allowing clamper arm 61 to pivot to the unclamped position with clamper 60 in a locked state (FIG. 1).

In this manner, clamper arm 61 can be in: a first state (FIG. 3), where clamper 60 is locked with clamper arm 61 and allows a disk at the playback position to be clamped; a second state (FIG. 7), where clamper arm 61 does not overlap with the stocked disks and disk selection operations are possible; and a third state (FIG. 4), where clamper arm 61 is moved away from clamper 60—which is in a clamped state.

The following is a description of the operations of disk playback device 1000 described above. Referring to FIG. 1–FIG. 4, the operations involved in playing back a disk inserted through slot 11A will first be described.

At a standby state (FIG. 1), in which a disk can be inserted through slot 11A, spring 39 causes driven and fixed disk guides 31, 32 to be positioned at an initial position, where the distance between belt 33 and friction sheet 34 is smaller than the diameter of the disk. Spring 41 causes pivoting arm 40 to be positioned so that engagement cavity 40A is disposed behind slot 11A. Clamper arm 61 is positioned at an unclamped position, where it does not overlap with a stocked disk D2. Optical mechanism 50 is at the rear position and the down position. Referring momentarily to FIG. 10, stocker 20 is disposed so that first disk holder 21 is aligned with the disk transfer height.

Referring also to FIG. 13, from this standby state, when disk D1 is inserted into slot 11A, the inserted front end of disk D1 is immediately guided into C-shaped groove 40C by sloped surface 40B. The engagement of slot 11A and engagement cavity 40A causes any upward or downward tilting in the insertion orientation of disk D1 to be corrected, and the inserted front end of the disk is prevented from engaging with the mechanisms within the device. As the disk is inserted, pivoting arm 40 pivots clockwise in opposition to the pull from spring 41, and maintaining disk D1 level. As the disk is inserted further, driven and fixed disk guides 31, 32 are spread apart in opposition to the pulling of spring 39. When pivoting arm 40 has pivoted to a prescribed angle, drive mechanism M1 begins driving belt 33 so that it rotates counter-clockwise. Since switching mechanism S1 is positioned to the rear of optical mechanism 50, the drive force of drive mechanism M1 is transferred to pulley 35. Belt 33 drives the left outer edge of disk D1, and disk D1 is transferred along friction sheet 34 toward the rear of the device while it is rotated clockwise. When disk D1 is being transferred toward the playback position, engagement cavity 40A of guide arm 40 goes through slit 32B of fixed disk guide 32, thus preventing engagement with fixed disk guide 32.

The angle of pivoting arm 40 is detected to determine when disk D1 has been brought to the playback position (FIG. 2). Belt 33 then stops rotating, and drive mechanism M3 causes clamper arm 61 to pivot counter-clockwise to the clamped position (FIG. 3). Then, drive mechanism M2 brings optical mechanism 50 to the up position so that disk D1 is interposed between turntable 51 and clamper 60. Then, drive mechanism M3 pivots clamper arm 61 clockwise, and driven and fixed disk guides 31, 32 and pivoting arm 40 are moved away from disk edge De (FIG. 4). When clamper arm 61 pivots clockwise, locked state of lock plate 62 is forcibly disabled because of the engagement with shaft 60A due to the stronger attraction between the magnet of clamper 60 and magnet 51A of turntable 51.

With the operations described above, disk D1 inserted from slot 11a is mounted on optical mechanism 50. A turntable drive motor (not shown in the drawing) rotates disk D1 at a prescribed linear velocity, and optical head 52 optically reads the recorded information. When disk D1 mounted on turntable 51 is to be ejected from slot 11A, the operations described above are performed in reverse. Thus, the detailed descriptions will be omitted here.

Referring to FIGS. 1–8, the following is a description of how disk D1 inserted from slot 11A is stored in first disk holder 21.

Figure 5:
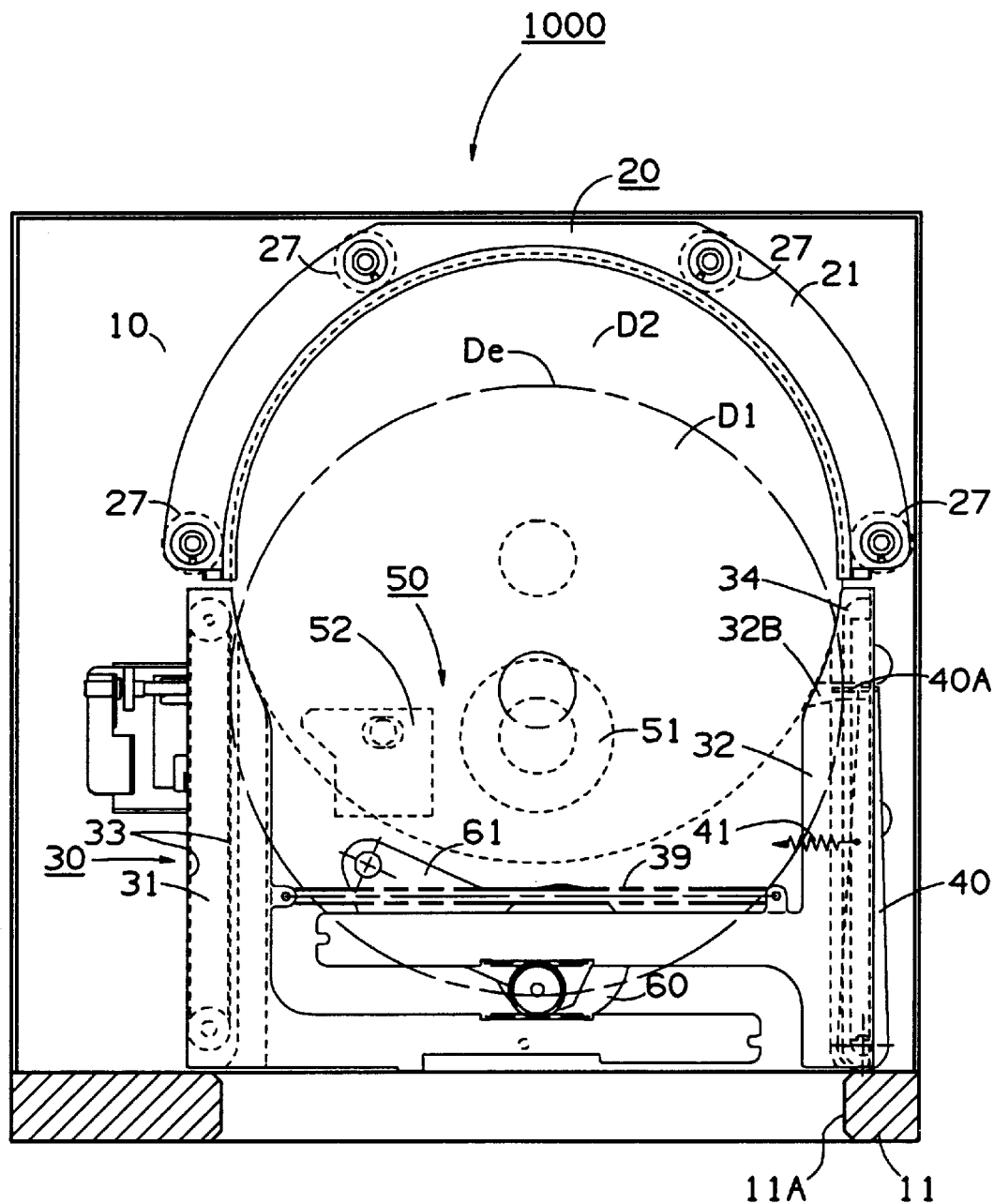
FIG. 5 is a top-view drawing for the purpose of describing the operations of disk playback device 1000.

As described above, when disk D1 is inserted through slot 11A, the inserted end of disk D1 is inserted into engagement cavity 40A of pivoting arm 40 to provide correction of insertion orientation. As the disk is inserted and pivoting arm 40 pivots to a prescribed angle, drive mechanism M1 begins applying counter-clockwise rotation to belt 33, and disk D1 is transferred toward the rear of the device while it is being rotated clockwise. As the disk is being transferred, pivoting arm 40 pivots clockwise, and is pivoted furthest clockwise at a midway position of disk D1 past the playback position (FIG. 5). Thereafter, as the disk is transferred, pivoting arm 40 engages with the edge of the disk toward the front of the device and pivots counterclockwise. At the midway position, the outer right edge drops into the cut section of friction sheet 34, but the narrow width of the cut section prevents any obstruction to the transfer of the disk. When disk D1 is transferred further and pivoting arm 40 returns counter-clockwise to a prescribed angle, disk D1 is assumed to have been transferred to a holding position, and the rotation of belt 33 is halted (FIG. 6).

Next, drive mechanism M2 moves optical mechanism 50 to a front position where the vertical movement of stocker 20 is not obstructed (FIG. 7). Drive mechanism M3 moves driven and fixed disk guides 31, 32 and pivoting arm 40 away from disk edge De (FIG. 8).

With the operations described above, disk D1 inserted through slot 11A is stored in first disk holder 21 of stocker 20, and disk playback device 1000 is put in a stopped state where stocker 20 can be moved up and down. Of course, the operations described above are performed in reverse to eject disk D1 from slot 11A.

The following is a description of the operations involved between the stopped state and the playback of disk D2 stored in second disk holder 22.

First, drive mechanism M1 drive the four stocker screws 27 so that they all rotate clockwise simultaneously, thus moving second disk holder 22 to the transfer height (FIG. 11). Then, drive mechanism M3 positions driven and fixed disk guides 31, 32 so that the disk is interposed between them (FIG. 7). Also, pivoting arm 40 is pivoted counter-clockwise and engages with disk edge De. Then, drive mechanism M4 moves optical mechanism 50 to the rear position (FIG. 6).

The transfer of optical mechanism 50 to the rear position causes switching mechanism S1 to switch to pulley 35, and drive mechanism M1 begins rotating belt 33 clockwise. While rotating counter-clockwise, disk D2 is transferred toward the front of the device. As the disk is being transferred, pivoting arm 40 is pivoted clockwise. When the disk passes the midway position (FIG. 5), pivoting arm 40 begins pivoting counter-clockwise since it engages with the edge of the disk toward the rear of the device. Then, when pivoting arm 40 rotates counter-clockwise to a prescribed angle, disk D2 is assumed to have been brought to the playback position, and the rotation of belt 33 is halted (FIG. 2).

When disk D2 has been brought to the playback position, drive mechanism M3 drives clamper arm 61 counter-clockwise, bringing it to the clamped position (FIG. 3). Then, drive mechanism M2 brings optical mechanism 50 to the up position, and disk D1 is interposed between turntable 51 and clamper 60. Drive mechanism M3 again drives clamper arm 61 clockwise, moving it away from clamper 60, and also moves driven and fixed disk guides 31, 32 and pivoting arm 40 away from disk edge De (FIG. 4). With the operations described above, disk D2 held in disk holder 22 is mounted on optical mechanism 50 and is then rotated at a prescribed linear velocity, and optical head 52 optically reads the recorded information.

The above description covered typical operations performed by the device of this embodiment. Other operations, such as operations performed from the standby state to play back a disk stored in stocker 20 and operations performed to swap a disk at the playback position with another disk in stocker 20, can be understood from the operations described above, so detailed descriptions will be omitted.

The present invention is not restricted to the embodiment described above and can take on various forms within the scope of the invention as described in the claims. For example, in the device of the embodiment described above, a disk is transferred by interposing the disk between driven and fixed disk guides 31, 32 extending in the disk transfer direction. However, the disk can also be interposed between two loading rollers instead. Also, pivoting arm 40 is used for the support member, but the support member is not restricted to providing pivotable support.

Furthermore, the locking of clamper 60 relative to clamper arm 61 is achieved via lock plate 62 and spring 64, but the locking configuration need not be restricted to this. Also, clamper 60 is fixed using the attraction of magnet 51A of turntable 51, and the locked state of lock plate 62 is forcibly disabled via the pivoting of clamper 60. However, the present invention is not restricted to these configurations. For example, a centering section for centering a disk on turntable 51 can engage with the clamper so that planar movement of the clamper is restricted and the locked state is forcibly disabled by the pivoting of clamper 60. Furthermore, lock plate 62 can be made to open and close at the clamped position. For example, a means for releasing lock plate 62 (i.e. a magnetic plunger) can be provided on clamper arm 61. In such a configuration, lock plate 62 can be disengaged without the rotation of clamper arm 61.

Figure 18:
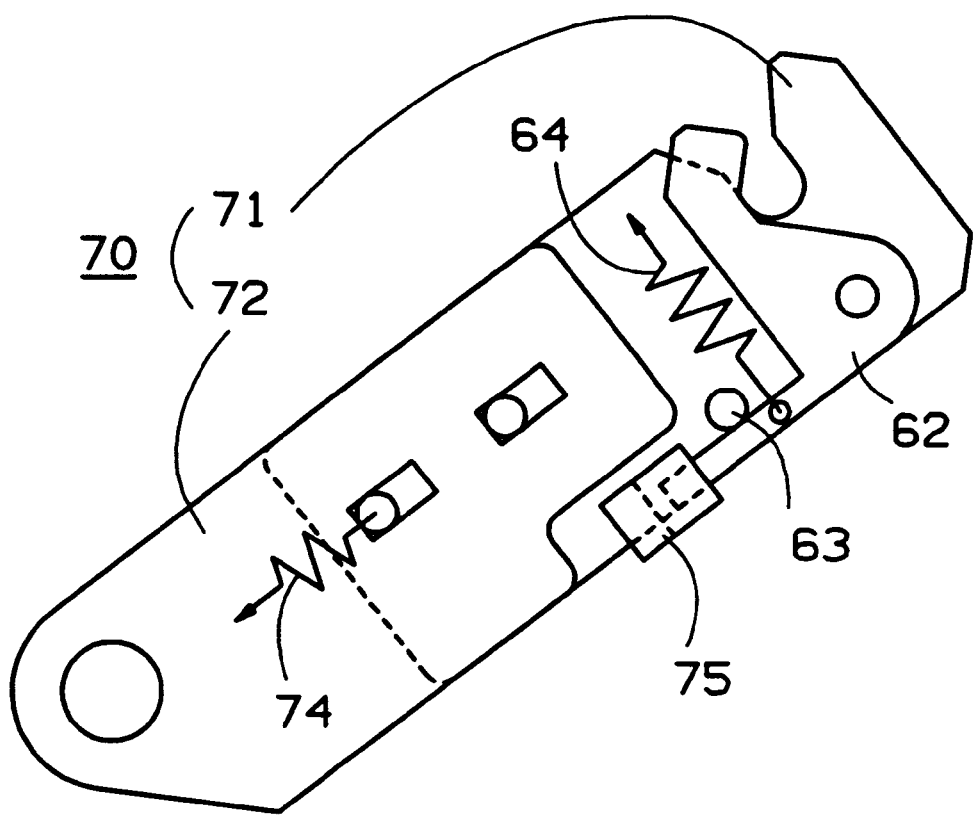
FIG. 18 is a plan drawing showing another embodiment of the clamper arm.

Referring to FIG. 18, the following is a description of another embodiment of clamper arm 61. Elements that are identical with those from the embodiment described above are assigned identical numerals and corresponding descriptions are omitted. A clamper 70 has a clamper arm 72 and a clamper arm 71. Clamper arm 71 can be extended and retracted relative to clamper arm 72. Clamper arm 71 is pulled by a spring 74 to be in a retracted state. Thus, lock plate 62 can be accurately supported even if there is a slight offset in the position of clamper 60 on the turntable. Also, clamper arm 71 has a sensor 75 for detecting whether lock plate 63 is opened or closed. Thus, it is possible to detect whether clamper 60 is completely supported, and clamper 60 can be safely removed.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

According to the present invention, the clamper arm can be moved away from the clamper in a clamped state. Thus, there is no need to have a wide gap between the playback disk and the stored disk so that the clamper arm can be inserted. This provides a more compact device and makes it possible to store a greater number of disks.

What is claimed is:

1. A clamping mechanism for a disk playback device comprising:
   a chassis;
   a clamper;
   a clamper arm;
   said clamper arm including a locking mechanism;
   said locking mechanism is moveable between a locked state and an unlocked state;
   said locking mechanism engages said clamper when said locking mechanism is in said locked state;
   said locking mechanism disengages said clamper when said locking mechanism is in said unlocked state;
   said clamper arm is moveably mounted on said chassis;
   said clamper arm being moveable between at least a first position and a second position;
   an optical mechanism moveably mounted in said chassis;
   said clamper arm is in axial alignment with said optical mechanism when said clamper arm is in said first position;
   said locking mechanism is capable of moving from said locked state to said unlocked state when said clamper arm is in said first position and said locking mechanism is in said locked state; and
   forcing means for selectively applying a force on said clamper when said clamper arm is in said first position effective to move said locking mechanism to said unlocked state and free said clamper from said clamper arm.

2. The clamping mechanism as in claim 1 further comprising:
   a disk holder for holding a plurality of disks moveably mounted in said chassis; and
   said second position being displaced from said first position so that when said clamper arm is in said second position, said disk holder is able to move.

3. A clamping mechanism as in claim 1 further including a projection extending from said clamper and wherein said locking mechanism comprises:
   a locking member pivotally mounted on said clamper arm;
   said locking member for engaging said projection;
   biasing means for biasing said locking member into said locked state;
   limiting means for limiting the biasing of said biasing means; and
   a sloped engagement surface on said locking member.

4. A clamping mechanism as in claim 3 wherein said locking mechanism further comprises:
   a clamper arm extension moveably mounted to said clamper arm; and
   urging means for urging said clamper arm extension toward said clamper arm.

5. A clamping mechanism as in claim 1 further comprising sensing means for sensing whether said locking mechanism is in said locked or unlocked state.

6. A clamping mechanism as in claim 1 wherein:
   said device is capable of playing a selected disk of a plurality of disks each having a recorded surface; and
   said second position of said clamper arm is in substantial parallel alignment with said recorded surface of said selected disk.

7. A clamping mechanism as in claim 1 where said forcing means comprises:
   a magnet disposed on at least one of said clamper and said optical mechanism;
   a magnetic material disposed on another of said clamper and said optical mechanism;
   whereby said magnet and said magnetic material are effective to apply a force on one another when said optical mechanism is in an up position so that if said clamper arm is moved from said first position to said second position, said locking mechanism is moved to said unlocked state.

8. A clamping mechanism for a disk playback device for playing a selected disk of a plurality of disks having a recorded surface comprising:
   a chassis;
   a clamper;
   a clamper arm including a locking mechanism;
   said locking mechanism is moveable between a locked state and an unlocked state;
   said locking mechanism engages said clamper when said locking mechanism is in said locked state;
   said locking mechanism disengages said clamper when said locking mechanism is in said unlocked state;
   said clamper arm is moveably mounted on said chassis;
   said clamper arm being moveable between at least a first position and a second position;
   an optical mechanism moveably mounted in said chassis;
   said clamper arm is in alignment with a center of said selected disk when said clamper arm is in said first position;
   said locking mechanism is capable of moving from said locked state to said unlocked state when said clamper arm is in said first position and said locking mechanism is in said locked state; and
   said second position of said clamper arm is located toward a peripheral of said selected disk.

9. A clamping mechanism as in claim 8 wherein said locking mechanism comprises:
   a magnet disposed on at least one of said clamper and said optical mechanism;
   a magnetic material disposed on another of said clamper and said optical mechanism;
   whereby said magnet and said magnetic material are effective to apply a force on one another so said if said clamper arm is moved from said first position to said second position, said locking mechanism is disengaged and said clamper is clamped with said optical mechanism.

10. A clamping mechanism as in claim 8 further comprising:
    a disk holder for holding a plurality of disks moveably mounted in said chassis; and
    said second position is further displaced from said first position so that when said clamper arm is in said second position, said disk holder is able to move.

11. A clamping mechanism as in claim 8 further including a projection extending from said clamper and wherein said locking mechanism comprises:

a locking member pivotally mounted on said clamper arm;

said locking member for engaging said projection;

biasing means for biasing said locking member into said locked state;

limiting means for limiting the biasing of said biasing means; and a sloped engagement surface on said locking member.

12. A clamping mechanism as in claim 11 wherein said locking mechanism further comprises:

a clamper arm extension moveably mounted to said clamper arm; and urging means for urging said clamper arm extension toward said clamper arm.

13. A clamping mechanism as in claim 8 further comprising sensing means for sensing whether said locking mechanism is in said locked or unlocked state.

14. A disk handling device comprising:

a clamper;

a projection extending from said clamper;

a clamper arm;

a resiliently urged member on said clamper arm;

said resiliently urged member having a resilient force;

said resilient force is effective to urge said resilient member toward a locking position;

said resiliently urged member also being effective to engage with said projection in said locking position;

said clamper including means for securely retaining a disk in a play position;

said clamper is moveable in concert with said clamper arm when said resiliently urged member is engaged with said projection; and said resilient force being small enough to permit said resiliently urged member to disengage with said projection when said disk is securely retained by said clamper and said clamper arm moves away from said clamper such that said clamper arm is moveable when said disk is securely retained by said clamper in said play position.

15. A disk handling device according to claim 14, further comprising:

said resiliently urged member having a shape permitting engagement of said clamper arm with said projection by urging said resiliently urged member into contact with said projection while said clamper securely retains said disk, whereby said clamper arm is enabled to move from said play position after said clamper releases said disk.

16. A clamping mechanism for clamping a disk in a playback device comprising:

a clamper;

a clamper arm;

said clamper arm including a locking mechanism;

said locking mechanism is moveable between a locked state and an unlocked state;

said locking mechanism engages said clamper when said locking mechanism is in said locked state;

said locking mechanism disengages said clamper when said locking mechanism is in said unlocked state;

said clamper arm is moveable when said locking mechanism engages said clamper; and forcing means effective to move said locking mechanism to said unlocked state and free said clamper from said clamper arm, whereby said clamper securely retains said disk when said clamper is free from said clamper arm.

17. A clamping mechanism as in claim 16 wherein said forcing means is disposed upon said clamper arm.

18. A clamping mechanism for clamping a disk in a playback device, comprising:

a clamper;

a clamper arm;

said clamper arm including a locking mechanism for engaging said clamper;

said locking mechanism is moveable between a locked state and an unlocked state;

said clamper arm is moveable from a first position to a second position;

said clamper arm is also moveable from said first position to a third position;

said first position is a playback position;

said locking mechanism engages said clamper when said clamper arm is in said second position;

said locking mechanism is disengageable from said clamper when said clamper arm is in said first position;

said locking mechanism is disengaged from said clamper when said clamper arm is in said third position; and forcing means effective to move said locking mechanism from said locked state to said unlocked state such that said clamper is released from said clamper arm whereby said clamper securely retains said disk.

19. A clamping mechanism as in claim 18, wherein said locking mechanism includes means for disengaging from said clamper while said clamper arm is in said first position.

20. A clamping mechanism as in claim 18, wherein said locking mechanism includes means for disengaging from said clamper when said clamper arm moves from said first position to said third position.

21. A clamping mechanism as in claim 18, wherein said locking mechanism engages said clamper as said clamper arm moves such that said clamper arm carries said clamper from said second position to said first position.

22. A clamping mechanism as in claim 18, wherein said locking mechanism engages said clamper as said clamper arm moves from said first position to said second position such that said clamper arm carries said clamper from said first position to said second position.

23. A clamping mechanism as in claim 18, wherein said second position and said third position are the same position.

24. A clamping mechanism as in claim 18, wherein:

said second position and said third position are the same position;

said locking mechanism engages said clamper as said clamper arm moves such that said clamper arm carries said clamper from said second position to said first position; and said locking mechanism includes means for disengaging from said clamper when said clamper arm moves from said first position to said third position.

25. A clamping mechanism as in claim 18, wherein:

said second position and said third position are the same position;

said locking mechanism engages said clamper as said clamper arm moves such that said clamper arm carries said clamper from said second position to said first position; and said locking mechanism includes means for disengaging from said clamper when said clamper arm is in said first position.

* * * * *